United States Patent
Shi et al.

(10) Patent No.: US 11,079,300 B2
(45) Date of Patent: Aug. 3, 2021

(54) AIR COOLING HEAT PUMP SYSTEM, REFRIGERANT LEAKAGE DETECTION METHOD AND DETECTION SYSTEM AIR COOLING HEAT PUMP SYSTEM THEREOF

(71) Applicant: Carrier Corporation, Palm Beach Gardens, FL (US)

(72) Inventors: Runfu Shi, Shanghai (CN); Hui Zhai, Shanghai (CN); Xiangyu Gao, Shanghai (CN); Guangyu Shen, Shanghai (CN); Yu Zhu, Shanghai (CN); YuHui Kuang, Shanghai (CN)

(73) Assignee: CARRIER CORPORATION, Palm Beach Gardens, FL (US)

(*) Notice: Subject to any disclaimer, the term of this patent is extended or adjusted under 35 U.S.C. 154(b) by 68 days.

(21) Appl. No.: 16/380,625

(22) Filed: Apr. 10, 2019

(65) Prior Publication Data
US 2019/0323917 A1    Oct. 24, 2019

(30) Foreign Application Priority Data
Apr. 13, 2018 (CN) .......................... 201810330315.0

(51) Int. Cl.
*G01M 3/28* (2006.01)

(52) U.S. Cl.
CPC ..... *G01M 3/2815* (2013.01); *F25B 2500/222* (2013.01); *F25B 2700/04* (2013.01)

(58) Field of Classification Search
CPC .......... F25B 2500/222; F25B 2700/04; G01M 3/2815
See application file for complete search history.

(56) References Cited

U.S. PATENT DOCUMENTS

| 5,934,087 A | 8/1999 | Watanabe et al. |
| 8,109,104 B2 | 2/2012 | Doll et al. |

(Continued)

FOREIGN PATENT DOCUMENTS

| EP | 1876403 A1 | 1/2008 |
| EP | 2354724 A2 | 11/2014 |

(Continued)

OTHER PUBLICATIONS

RefriApp, "Refrigerant leaks remote detection LECOsystem", available at: http://refriapp.es/en/products/lecosystem/, accessed: Mar. 27, 2018, 7 pages.

(Continued)

*Primary Examiner* — Marc E Norman
*Assistant Examiner* — Schyler S Sanks
(74) *Attorney, Agent, or Firm* — Cantor Colburn LLP

(57) ABSTRACT

A refrigerant leak detecting method for an air-cooling heat pump system in a heating mode comprises S110, S210, obtaining a leak indication parameter set, wherein the leak indication parameter set at least includes a refrigerant level in a liquid reservoir and/or a supercooling degree; S120, S220, comparing each leak indication parameter in the leak indication parameter set with a corresponding preset indication parameter interval; S130, S230, when each leak indication parameter falls within a corresponding preset indication parameter interval, obtaining and recording a corresponding evaluated refrigerant leak amount; S140, S240, when a cumulative value of the evaluated refrigerant leak amount falls within a preset refrigerant leak interval, determining that a refrigerant leak occurs in the air-cooling heat pump system; when the cumulative value of the evaluated refrigerant leak amount does not fall within the preset refrigerant leak interval, returning to the step S110, S210.

11 Claims, 4 Drawing Sheets

(56) References Cited

U.S. PATENT DOCUMENTS

| | | | |
|---|---|---|---|
| 8,215,121 B2 | 7/2012 | Yoshimi et al. | |
| 9,791,195 B2 | 10/2017 | Okada et al. | |
| 9,869,499 B2 | 1/2018 | Liu et al. | |
| 2002/0139128 A1* | 10/2002 | Suzuki | F25B 49/005 62/129 |
| 2005/0056031 A1 | 3/2005 | Jeong | |
| 2006/0048524 A1 | 3/2006 | Komatsu | |
| 2006/0196224 A1* | 9/2006 | Esslinger | F25B 49/005 62/509 |
| 2010/0275626 A1* | 11/2010 | Nishimura | F25B 49/005 62/149 |
| 2015/0007591 A1* | 1/2015 | Liu | F25B 49/005 62/77 |
| 2016/0103457 A1 | 4/2016 | Maughan et al. | |
| 2016/0109170 A1 | 4/2016 | Schrey et al. | |
| 2016/0146488 A1 | 5/2016 | Ochiai et al. | |
| 2016/0356534 A1 | 12/2016 | Hatada et al. | |
| 2017/0268811 A1 | 9/2017 | Ochiai et al. | |

FOREIGN PATENT DOCUMENTS

| | | | |
|---|---|---|---|
| EP | 3348939 A1 * | 7/2018 | F24F 11/52 |
| GB | 2260816 A | 2/1993 | |
| JP | 2017053566 A | 3/2017 | |
| KR | 20120013831 A | 2/2012 | |
| KR | 20140099747 | 8/2014 | |
| WO | 2010007448 A1 | 1/2010 | |

OTHER PUBLICATIONS

European Search Report for application EP 19167085.0, dated Aug. 22, 2019, 175 pages.

\* cited by examiner

AIR COOLING HEAT PUMP SYSTEM, REFRIGERANT LEAKAGE DETECTION METHOD AND DETECTION SYSTEM AIR COOLING HEAT PUMP SYSTEM THEREOF

BACKGROUND

The present application relates to the field of heat pumps, and more particularly to a refrigerant leak detecting method and system for an air source (air-cooling) heat pump system.

With the development of heat pump systems becoming more mature, the further development direction at present is to make more optimized and fine improvements on heat pump systems from all directions. For example, to ensure system efficiency, adequate refrigerant charge is required. However, during operation, refrigerant may leak from the piping of a heat pump system for very different reasons. On one hand, this will directly affect the amount of refrigerant involved in the system, which thus affects work efficiency; on the other hand, this may even cause the system to trigger a pressure protection limit or a temperature protection limit, which further causes system downtime. In some countries or regions, refrigerant leaks may also be taxed or fined. In summary, the refrigerant leak problem in heat pump systems may result in reduction of system efficiency, environmental pollution, and additional waste of refrigerant charge.

Therefore, it is really necessary to timely detect and warn this problem. In one type of current technologies, maintenance personnel may detect leaks in a particular heat pump system through specialized equipment, but such detection is time consuming and costly. Moreover, before the implementation of this special detection, the refrigerant leak condition of the system is not known, which will bring additional time and cost consumption.

Therefore, how to provide a reliable and convenient method and system for detecting a refrigerant leak for a heat pump system has become a technical problem urgent to be solved.

SUMMARY

Viewed from a first aspect, the present invention provides, a refrigerant leak detecting method for an air-cooling heat pump system is provided, wherein the method includes (i), obtaining a leak indication parameter set, wherein the leak indication parameter set at least includes, in a heating mode of the air-cooling heat pump system, a refrigerant level in a liquid reservoir and/or, in a cooling mode of the air-cooling heat pump system, a supercooling degree; (ii), comparing each leak indication parameter in the leak indication parameter set with a corresponding preset indication parameter interval; (iii), when each leak indication parameter falls within a corresponding preset indication parameter interval, obtaining and recording a corresponding evaluated refrigerant leak amount; (iv), when a cumulative value of the evaluated refrigerant leak amount falls within a preset refrigerant leak interval, determining that a refrigerant leak occurs in the air-cooling heat pump system; when the cumulative value of the evaluated refrigerant leak amount does not fall within the preset refrigerant leak interval, returning to the step (i).

The steps below may apply when the leak indication parameter set includes a refrigerant level in a liquid reservoir or when the leak indication parameter set includes a supercooling degree, as appropriate.

Optionally, the method further includes (v), performing an alarm operation when determining that a refrigerant leak occurs in the air-cooling heat pump system.

Optionally, the leak indication parameter set further includes one or more of the following: compressor speed or compressor capacity; and expansion valve opening and superheat degrees.

Optionally, the leak indication parameters in the leak indication parameter set are each used to indicate different refrigerant leak degrees; in the step (ii), the leak indication parameters in the leak indication parameter set are each compared with the corresponding preset indication parameter intervals according to a trend indicating refrigerant leak degrees from high to low.

Optionally, the compressor speed or the compressor capacity; the expansion valve opening and superheat degrees; and the refrigerant level are used to indicate refrigerant leak degrees from high to low, respectively.

Optionally, in the step (iii), when each leak indication parameter in the leak indication parameter set falls within a preset indication parameter interval, the compressor speed or compressor capacity; the expansion valve opening and superheat degrees; and the refrigerant level in the leak indication parameter set correspond to evaluated refrigerant leak amounts from high to low, respectively.

Optionally, the step (ii) further includes comparing the compressor speed or the compressor capacity with a corresponding preset indication parameter interval when an inlet and outlet water temperature difference of a heat exchanger is less than a preset inlet and outlet water temperature difference; and comparing the expansion valve opening and superheat degrees with corresponding preset indication parameter intervals when the inlet and outlet water temperature difference of the heat exchanger is not less than the preset inlet and outlet water temperature difference; or comparing the refrigerant level with a corresponding preset indication parameter interval when the inlet and outlet water temperature difference of the heat exchanger is not less than the preset inlet and outlet water temperature difference.

Optionally, the step (ii) further includes obtaining the expansion valve opening degree when the inlet and outlet water temperature difference of the heat exchanger is not less than the preset inlet and outlet water temperature difference; when the expansion valve opening degree reaches a preset opening degree threshold, comparing the superheat degree with the corresponding preset indication parameter interval; and when the expansion valve opening degree is less than the preset opening degree threshold, comparing the refrigerant level with the corresponding preset indication parameter interval.

Optionally, after the air-cooling heat pump system operates for more than a first preset time, (i) is executed.

Optionally, the method further includes (vi), after the downtime of the air-cooling heat pump system is more than a second preset time, obtaining the refrigerant level in the liquid reservoir and/or the compressor discharge pressure, and comparing the refrigerant level and/or the compressor discharge pressure with respective corresponding preset indication parameter intervals; when the refrigerant level and/or the compressor discharge pressure fall(s) within the respective corresponding preset indication parameter intervals, determining that a refrigerant leak occurs in the air-cooling heat pump system.

In relation to the features discussed below, the leak indication parameter set at least includes supercooling degree.

Optionally, the method further includes (v), performing an alarm operation when determining that a refrigerant leak occurs in the air-cooling heat pump system.

Optionally, the leak indication parameter set further includes one or more of the following: compressor speed or compressor capacity; expansion valve opening and superheat degrees; and compressor discharge pressure.

Optionally, the leak indication parameters in the leak indication parameter set are each used to indicate different refrigerant leak degrees; in the step (ii), the leak indication parameters in the leak indication parameter set are each compared with the corresponding preset indication parameter intervals according to a trend indicating refrigerant leak degrees from high to low.

Optionally, the compressor speed or the compressor capacity; the expansion valve opening and superheat degrees; the compressor discharge pressure; and supercooling degree are used to indicate the refrigerant leak degrees from high to low, respectively.

Optionally, in the step (iii), when each leak indication parameter in the leak indication parameter set falls within a preset indication parameter interval, the compressor speed or compressor capacity; the expansion valve opening and superheat degrees; the compressor discharge pressure; and the supercooling degree in the leak indication parameter set correspond to evaluated refrigerant leak amounts from high to low, respectively.

Optionally, the step (ii) further includes comparing the compressor speed or the compressor capacity with a corresponding preset indication parameter interval when an inlet and outlet water temperature difference of a heat exchanger is less than a preset inlet and outlet water temperature difference; and comparing the expansion valve opening and superheat degrees with corresponding preset indication parameter intervals when the inlet and outlet water temperature difference of the heat exchanger is not less than the preset inlet and outlet water temperature difference; or comparing the compressor discharge pressure with a corresponding preset indication parameter interval when the inlet and outlet water temperature difference of the heat exchanger is not less than the preset inlet and outlet water temperature difference; or comparing the supercooling degree with a corresponding preset indication parameter interval when the inlet and outlet water temperature difference of the heat exchanger is not less than the preset inlet and outlet water temperature difference.

Optionally, the step (ii) further includes obtaining a supercooling degree when the inlet and outlet water temperature difference of the heat exchanger is not less than the preset inlet and outlet water temperature difference; and when the supercooling degree is not greater than a preset supercooling degree, comparing the supercooling degree with the corresponding preset indication parameter interval; or when the supercooling degree is greater than the preset supercooling degree, comparing the superheat degree and the expansion valve opening degree with the respective corresponding preset indication parameter intervals.

Optionally, the step (ii) further includes obtaining the expansion valve opening when the supercooling degree is greater than the preset supercooling degree; when the expansion valve opening degree reaches a preset opening degree threshold, comparing the superheat degree with the corresponding preset indication parameter interval; and when the expansion valve opening degree is less than the preset opening degree threshold, comparing the compressor discharge pressure with the corresponding preset indication parameter interval.

Optionally, after the air-cooling heat pump system is operated for more than a first preset time, (i) is executed.

Optionally, the method further includes (vi), after the downtime of the air-cooling heat pump system is more than a second preset time, obtaining the refrigerant level in the liquid reservoir and/or the compressor discharge pressure, and comparing the refrigerant level and/or the compressor discharge pressure with respective corresponding preset indication parameter intervals; and when the refrigerant level and/or the compressor discharge pressure fall(s) within the respective corresponding preset indication parameter intervals, determining that a refrigerant leak occurs in the air-cooling heat pump system.

Another aspect of the present invention provides a refrigerant leak detecting system for an air-cooling heat pump system, wherein the detecting system is used for the refrigerant leak detecting method for an air-cooling heat pump system as described above.

An air-cooling heat pump system may include the refrigerant leak detecting system for an air-cooling heat pump system as described above.

The refrigerant leak detecting method and system for an air-cooling heat pump system according to the present application are implemented by obtaining a leak indication parameter set, in particular, the parameter refrigerant level in a liquid reservoir, and then comparing the parameter with a corresponding preset indication parameter interval to obtain a corresponding evaluated refrigerant leak amount, and finally, determining that a refrigerant leak occurs in the air-cooling heat pump system when the evaluated refrigerant leak amount falls within a preset refrigerant leak interval. On one hand, it can improve the determination accuracy and reduce the risk of false determination. On the other hand, the method is simple and convenient to operate, so the refrigerant leak condition of the air-cooling heat pump system can be quickly obtained, so as to take follow-up measures.

DRAWING DESCRIPTION

Certain example embodiments of the invention will now be described by way of example only and with reference to the accompanying drawings in which.

DETAILED DESCRIPTION

Figure 1:
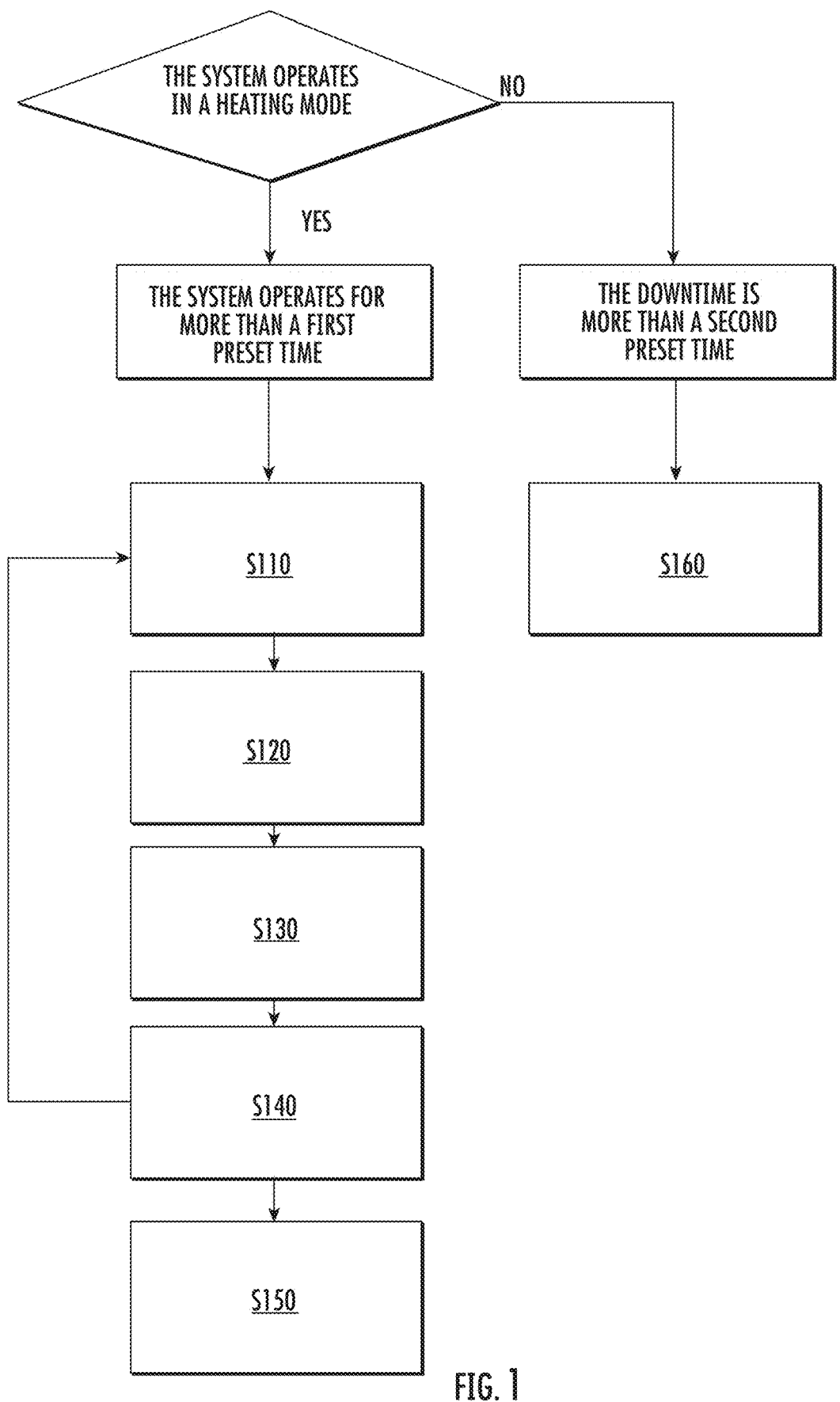
FIG. 1 is a schematic step chart of a refrigerant leak detecting method for an air-cooling heat pump system.

Referring to FIG. 1, a refrigerant leak detecting method for an air-cooling heat pump system is shown. More specifically, the method may perform refrigerant leak detection while the air-cooling heat pump system is operating in a heating mode, thereby avoiding the use of special leak detection equipment, saving detection time, improving efficiency and being more convenient. Specifically, the method at least includes the following steps: S110, obtaining a leak indication parameter set, wherein the leak indication parameter set at least includes a refrigerant level in a liquid reservoir; S120, comparing each leak indication parameter in the leak indication parameter set with a corresponding preset indication parameter interval; S130, when each leak indication parameter falls within a corresponding preset indication parameter interval, obtaining and recording a corresponding evaluated refrigerant leak amount; S140, when a cumulative value of the evaluated refrigerant leak amount falls within a preset refrigerant leak interval, determining that a refrigerant leak occurs in the air-cooling heat pump system; when the cumulative value of the evaluated refrigerant leak amount does not fall within the preset refrigerant leak interval, returning to the step S110.

For the same air-cooling heat pump system, generally, the amount of refrigerant required to participate in its operation in a cooling mode is generally greater than that in a heating mode. Therefore, in the heating mode, part of the refrigerant is usually temporarily stored in the liquid reservoir of the system, and can be visually reflected in the form of the refrigerant level in the liquid reservoir. Therefore, if the refrigerant of the system leaks, the refrigerant reserve in the liquid reservoir will decrease when the system is running in the heating mode, and the refrigerant level will drop directly and will be reflected by a window or an action of a float valve. Considering that this parameter can accurately and reliably reflect a refrigerant leak condition, in the process of implementing the method, a leak indication parameter set, in particular, the parameter refrigerant level in a liquid reservoir, is first obtained, and then the parameter is compared with a corresponding preset indication parameter interval to obtain a corresponding evaluated refrigerant leak amount, and finally, it is determined that a refrigerant leak occurs in the air-cooling heat pump system when the evaluated refrigerant leak amount falls within a preset refrigerant leak interval. On one hand, it can improve the determination accuracy and reduce the risk of false determination. On the other hand, the method is simple and convenient to operate, so the refrigerant leak condition of the air-cooling heat pump system can be quickly obtained, so as to take follow-up measures.

Furthermore, additionally, the method further includes S150, i.e., an additional alarm function, and an alarm operation is performed when it is determined that a refrigerant leak occurs in the air-cooling heat pump system.

It should be understood that although the refrigerant level in the liquid reservoir can be used to determine the corresponding refrigerant leak condition of the system, the parameter is not the only parameter for the determination. For example, in the step S110, the leak indication parameter set further includes one or more of the following: compressor speed or compressor capacity; expansion valve opening and superheat degrees. By applying these parameters alone or applying a combination thereof, it is possible to determine the refrigerant leak condition of the system. Different judgment parameters or combinations thereof may bring different judgment accuracy, or indicate different refrigerant leak degrees of the system, or have different operational conveniences. It can be selected as appropriate for the purpose of the detection in the actual application.

As one of examples, the leak indication parameters in the leak indication parameter set are each used to indicate different refrigerant leak degrees; in S120, the leak indication parameters in the leak indication parameter set are each compared with the corresponding preset indication parameter intervals according to a trend indicating refrigerant leak degrees from high to low. In the case of such a detection sequence, the refrigerant leak degree of the system can be obtained while detecting whether the system has a refrigerant leak problem. More specifically, in the case of adoption of the three sets of parameters enumerated above, the compressor speed or the compressor capacity, the expansion valve opening and superheat degrees, and the refrigerant level are used to indicate the refrigerant leak degrees from high to low, respectively. In this case, if it is determined that a refrigerant leak occurs in the system through the comparative analysis of the compressor speed or the compressor capacity, it indicates that the leak degree of the system is very serious; and if it is not determined that a refrigerant leak occurs through the comparative analysis of the compressor speed or the compressor capacity, but it is determined that a refrigerant leak occurs in the system through the comparative analysis of the expansion valve opening and superheat degrees, it indicates that the leak degree of the system is moderate; on this basis, if it is not determined that a refrigerant leak occurs through the comparative analysis of the expansion valve opening and superheat degrees, but it is determined that a refrigerant leak occurs in the system through the comparative analysis of the refrigerant level, it indicates that the leak degree of the system is relatively low.

Although the foregoing examples only provide an analysis of several sets of leak indication parameters enumerated in the leak indication parameter set, in fact, when more leak indication parameters are introduced, refrigerant leak degrees corresponding to various leak indication parameters may be obtained first through experimental or simulation analysis and ranked, and then the method steps described above may still be used directly.

Likewise, although the foregoing examples only illustrate the different refrigerant leak degrees indicated by the various leak indication parameters in the leak indication parameter set, in fact, determination accuracies or operation conveniences corresponding to various leak indication parameters may also be obtained through experimental or simulation analysis and ranked, and then the method steps described above may still be used directly.

In another aspect, in S130, when each leak indication parameter in the leak indication parameter set falls within a preset indication parameter interval, it means that the compressor speed or compressor capacity, the expansion valve opening and superheat degrees, and the refrigerant level in the leak indication parameter set correspond to evaluated refrigerant leak amounts from high to low, respectively. That is, a set of determination rule is set based on the determination demand, that is, only when the cumulative value of the evaluated refrigerant leak amount falls within the preset refrigerant leak interval, it is then determined that a refrigerant leak occurs in the air-cooling heat pump system. That is, in a certain determination process, the evaluated refrigerant leak amount is large enough to directly trigger a positive determination that a leak occurs, or in a continuous determination for a period of time, the cumulative value of the evaluated refrigerant leak amount is so large that the positive determination is triggered. Under this rule, it is easier to avoid false determination and it is easier to control the serious leak problem.

Optionally, when there are multiple leak indication parameters in the leak indication parameter set and the leak indication parameters are sequentially used for determination, the step S120 further includes comparing the compressor speed or the compressor capacity with a corresponding preset indication parameter interval when an inlet and outlet water temperature difference of a heat exchanger is less than a preset inlet and outlet water temperature difference; and comparing the expansion valve opening and superheat degrees with corresponding preset indication parameter intervals when the inlet and outlet water temperature difference of the heat exchanger is not less than the preset inlet and outlet water temperature difference; or comparing the refrigerant level with a corresponding preset indication parameter interval when the inlet and outlet water temperature difference of the heat exchanger is not less than the preset inlet and outlet water temperature difference. The step further includes obtaining the expansion valve opening degree when the inlet and outlet water temperature difference of the heat exchanger is not less than the preset inlet and outlet water temperature difference; when the expansion valve opening degree reaches a preset opening degree threshold with a reference value of 100%, comparing the superheat degree with the corresponding preset indication parameter interval; and when the expansion valve opening degree is less than the preset opening degree threshold with a reference value of 100%, comparing the refrigerant level with the corresponding preset indication parameter interval.

The foregoing embodiments focus on how to perform refrigerant leak detection when the air-cooling heat pump system is operating in the heating mode. In fact, to ensure detection accuracy, it is often desirable to perform the detecting method after the system has been running for a period of time. For example, after the air-cooling heat pump system operates for more than a first preset time, for example, half an hour, then S110 is executed.

In addition, when the air-cooling heat pump system is not operating, there is also a mated refrigerant leak detecting method. For example, the method further includes S160, after the downtime of the air-cooling heat pump system is more than a second preset time, obtaining the refrigerant level in the liquid reservoir and/or a maximum pressure value of the refrigerant in the system, wherein the maximum pressure value of the refrigerant is usually a compressor discharge pressure; and comparing the refrigerant level and/or the compressor discharge pressure with respective corresponding preset indication parameter intervals; and when the refrigerant level and/or the compressor discharge pressure fall(s) within the respective corresponding preset indication parameter intervals, determining that a refrigerant leak occurs in the air-cooling heat pump system.

It should be understood that for the convenience of comparative analysis, the parameters used in determination herein are recommended to use their absolute values.

Figure 2:
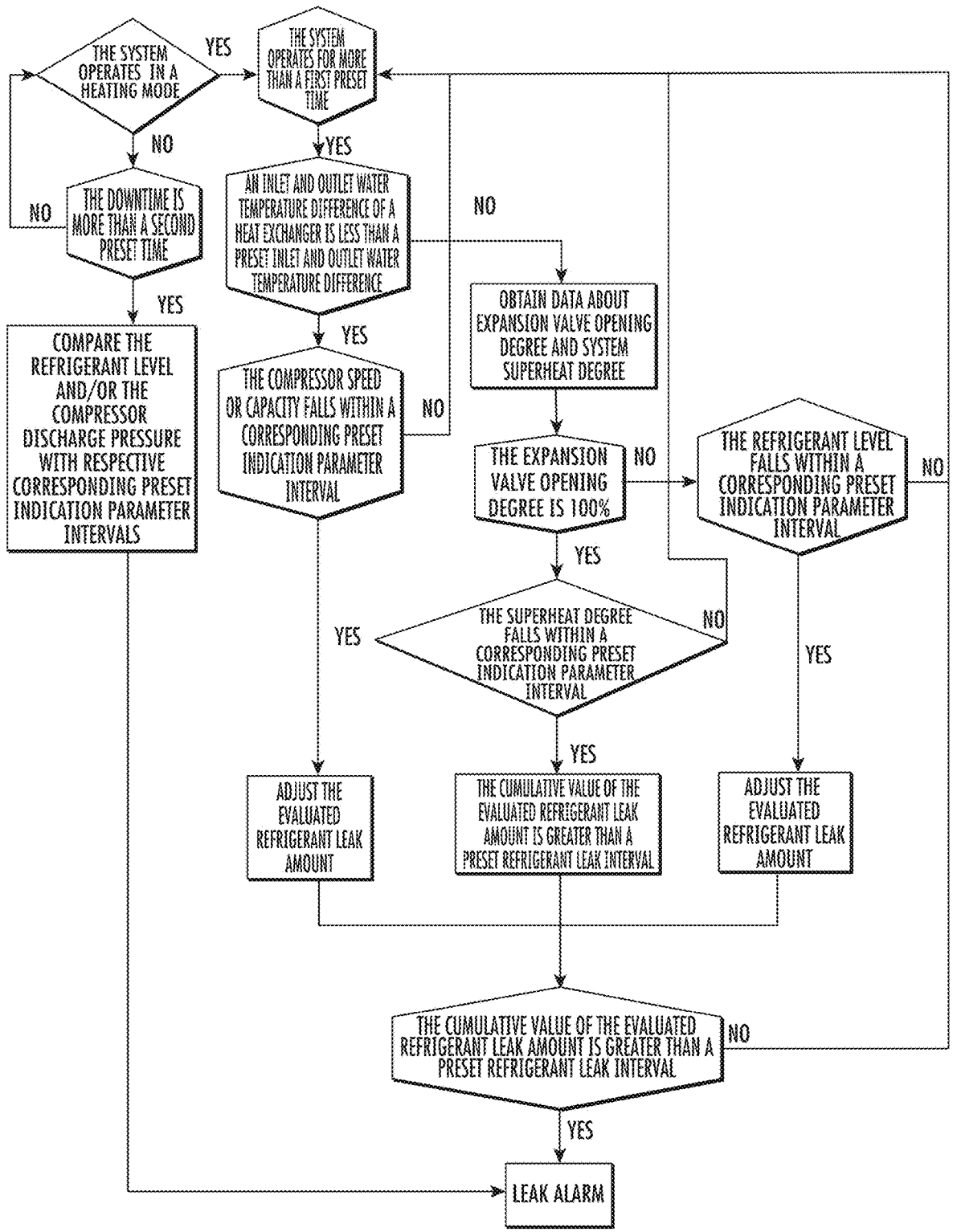
FIG. 2 is a control flow chart of the refrigerant leak detecting method for an air-cooling heat pump system.

Referring to FIG. 2, a set of control flow of the refrigerant leak detecting method for an air-cooling heat pump system will be described below in conjunction with the above described method.

First, it is first determined whether the air-cooling heat pump system is operating in a heating mode.

When the system is operating in the heating mode and continues to operate for more than the first predetermined time, a refrigerant leak detecting step is started. In this case, if the inlet and outlet water temperature difference of the system is less than a preset inlet and outlet water temperature difference (for example, 1° C.), the system then enters the first branch process to determine whether the compressor speed or the compressor capacity falls within a corresponding preset indication parameter interval, and if the result of the determination is YES, a corresponding evaluated refrigerant leak amount is obtained and recorded (for example, 5 points); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

In addition, if the inlet and outlet water temperature difference of the system is not less than the preset inlet and outlet water temperature difference (for example, 1° C.), the system then enters the second branch process to obtain data about expansion valve opening degree and system superheat degree. When the expansion valve opening degree reaches a preset threshold with a reference value of 100%, it is determined whether the superheat degree falls within a corresponding preset indication parameter interval, and if the result of the determination is YES, a corresponding evaluated refrigerant leak amount is obtained and recorded (for example, 3 points); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

Furthermore, if the expansion valve opening degree of the system is less than the preset threshold with a reference value of 100%, the system then enters the third branch process to determine whether the refrigerant level in the liquid reservoir falls within a corresponding preset indication parameter interval, and if the result of the determination is YES, a corresponding evaluated refrigerant leak amount is obtained and recorded (for example, 1 point); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

In another example, when the air-cooling heat pump system is not operating in the heating mode and remains a down state for more than the second preset time, a refrigerant leak detecting step in the down state is started. In this case, the refrigerant level in the liquid reservoir and/or the compressor discharge pressure are/is obtained and then compared the refrigerant level and/or the compressor discharge pressure with respective corresponding preset indication parameter intervals; and when the refrigerant level and/or the compressor discharge pressure fall(s) within the respective corresponding preset indication parameter intervals, it is determined that a refrigerant leak occurs in the air-cooling heat pump system.

Figure 3:
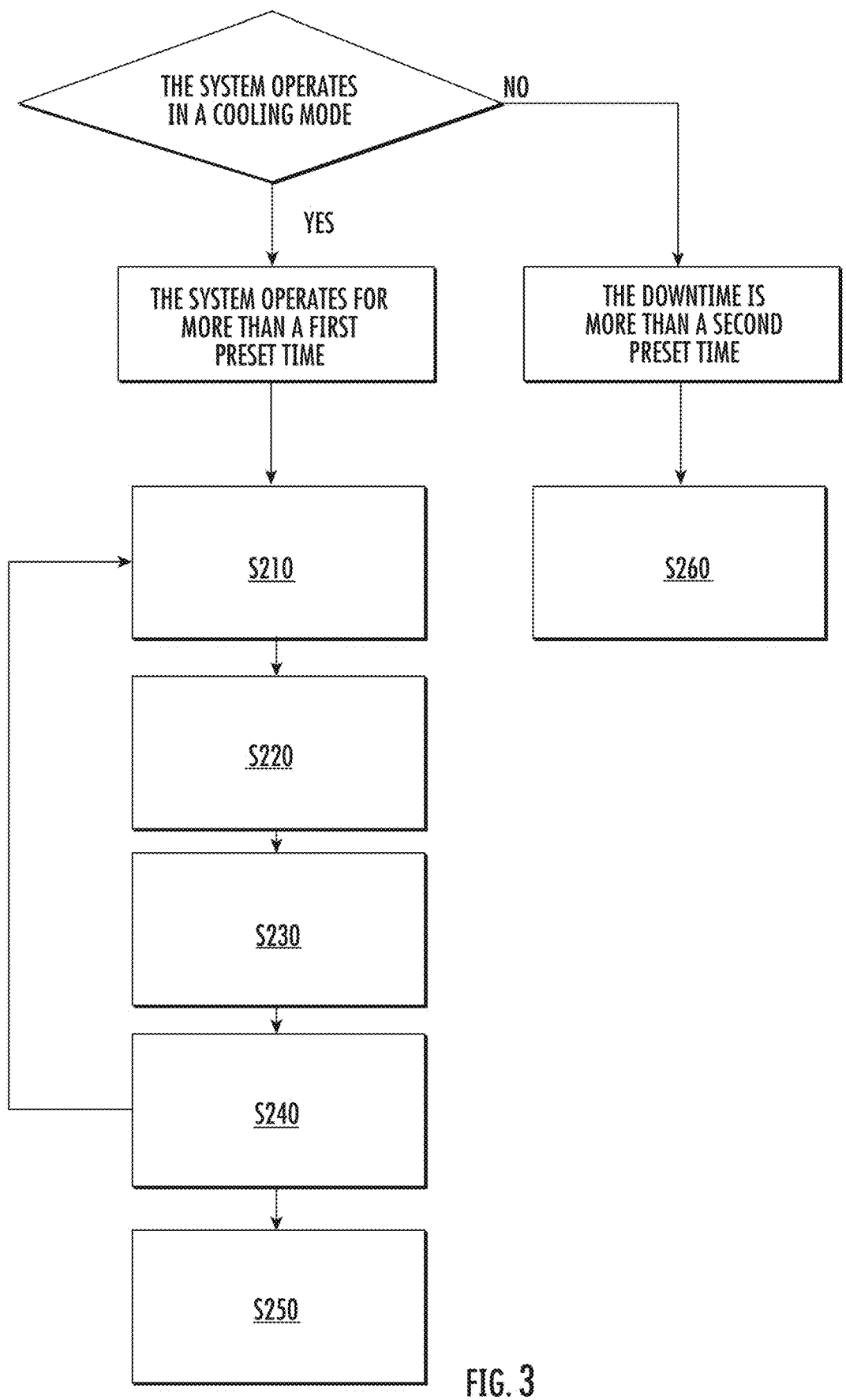
FIG. 3 is a schematic step chart of another refrigerant leak detecting method for an air-cooling heat pump system.

Referring to FIG. 3, another refrigerant leak detecting method for an air-cooling heat pump system is shown, and more particularly, the method may perform refrigerant leak detection while the air-cooling heat pump system is operating in a cooling mode, thereby avoiding the use of special leak detection equipment, saving detection time, improving efficiency and being more convenient. Specifically, the method at least includes the following steps: S210, obtaining a leak indication parameter set, wherein the leak indication parameter set at least includes supercooling degree; S220, comparing each leak indication parameter in the leak indication parameter set with a corresponding preset indication parameter interval; S230, when each leak indication parameter falls within a corresponding preset indication parameter interval, obtaining and recording a corresponding evaluated refrigerant leak amount; S240, when a cumulative value of the evaluated refrigerant leak amount falls within a preset refrigerant leak interval, determining that a refrigerant leak occurs in the air-cooling heat pump system; when the cumulative value of the evaluated refrigerant leak amount does not fall within the preset refrigerant leak interval, returning to the step S210.

For an air-cooling heat pump system, the pre-charge of the refrigerant is typically based on the amount of refrigerant that is required to participate in the operation of the air-cooling heat pump system running at a full load in a cooling mode. Therefore, if the refrigerant of the system leaks, it will directly affect the performance of the system in the cooling mode. Therefore, it is possible to determine whether or not a refrigerant leak occurs in the system by an abnormal change in a performance parameter of the system. For example, considering that the supercooling degree of the system can accurately and reliably reflect a refrigerant leak condition, in the process of implementing the method, a leak indication parameter set, in particular, the parameter supercooling degree, is first obtained, and then the parameter is compared with a corresponding preset indication parameter interval to obtain a corresponding evaluated refrigerant leak amount, and finally, it is determined that a refrigerant leak occurs in the air-cooling heat pump system when the evaluated refrigerant leak amount falls within a preset refrigerant leak interval. On one hand, it can improve the determination accuracy and reduce the risk of false determination. On the other hand, the method is simple and convenient to operate, so the refrigerant leak condition of the air-cooling heat pump system can be quickly obtained, so as to take follow-up measures.

Furthermore, additionally, the method further includes S250, i.e., an additional alarm function is provided, and an alarm operation is performed when it is determined that a refrigerant leak occurs in the air-cooling heat pump system.

It should be understood that although the supercooling degree can be used to determine the corresponding refrigerant leak condition of the system, the parameter is not the only parameter for the determination. For example, in S210, the leak indication parameter set further includes one or more of the following: compressor speed or compressor capacity; expansion valve opening and superheat degrees; and compressor discharge pressure. By applying these parameters alone or applying a combination thereof, it is possible to determine the refrigerant leak condition of the system. Different judgment parameters or combinations thereof may bring different judgment accuracy, or indicate different refrigerant leak degrees of the system, or have different operational conveniences. It can be selected as appropriate for the purpose of the detection in the actual application.

As one of examples, the leak indication parameters in the leak indication parameter set are each used to indicate different refrigerant leak degrees; in S220, the leak indication parameters in the leak indication parameter set are each compared with the corresponding preset indication parameter intervals according to a trend indicating refrigerant leak degrees from high to low. In the case of such a detection sequence, the refrigerant leak degree of the system can be obtained while detecting whether the system has a refrigerant leak problem. More specifically, in the case of adoption of the four sets of parameters enumerated above, the compressor speed or the compressor capacity, the expansion valve opening and superheat degrees, the compressor discharge pressure and the supercooling degree are used to indicate the refrigerant leak degrees from high to low, respectively. In this case, if it is determined that a refrigerant leak occurs in the system through the comparative analysis of the compressor speed or the compressor capacity, it indicates that the leak degree of the system is very serious; and if it is not determined that a refrigerant leak occurs through the comparative analysis of the compressor speed or the compressor capacity, but it is determined that a refrigerant leak occurs in the system through the comparative analysis of the expansion valve opening and superheat degrees, it indicates that the leak degree of the system is relatively serious; and if it is not determined that a refrigerant leak occurs through the comparative analysis of the expansion valve opening and superheat degrees, but it is determined that a refrigerant leak occurs in the system through the comparative analysis of the compressor discharge pressure, it indicates that the leak degree of the system is moderate. On this basis, if it is not determined that a refrigerant leak occurs through the comparative analysis of the compressor discharge pressure, but it is determined that a refrigerant leak occurs in the system through the comparative analysis of the supercooling degree, it indicates that the leak degree of the system is relatively low.

Although the foregoing examples only provide an analysis of several sets of leak indication parameters enumerated in the leak indication parameter set, in fact, when more leak indication parameters are introduced, refrigerant leak degrees corresponding to various leak indication parameters may be obtained first through experimental or simulation analysis and ranked, and then the method steps described above may still be used directly.

Likewise, although the foregoing examples only illustrate the different refrigerant leak degrees indicated by the various leak indication parameters in the leak indication parameter set, in fact, determination accuracies or operation conveniences corresponding to various leak indication parameters may also be obtained through experimental or simulation analysis and ranked, and then the method steps described above may still be used directly.

In another aspect, in S230, when each leak indication parameter in the leak indication parameter set falls within a preset indication parameter interval, the compressor speed or compressor capacity; the expansion valve opening and superheat degrees; the compressor discharge pressure; and the supercooling degree in the leak indication parameter set correspond to evaluated refrigerant leak amounts from high to low, respectively. That is, a set of determination rule is set based on the determination demand, that is, only when the cumulative value of the evaluated refrigerant leak amount falls within the preset refrigerant leak interval, it is then determined that a refrigerant leak occurs in the air-cooling heat pump system. That is, in a certain determination process, the evaluated refrigerant leak amount is large enough to directly trigger a positive determination that a leak occurs, or in a continuous determination for a period of time, the cumulative value of the evaluated refrigerant leak amount is so large that the positive determination is triggered. Under this rule, it is easier to avoid false determination and it is easier to control the serious leak problem.

Optionally, when there are multiple leak indication parameters in the leak indication parameter set and the leak indication parameters are sequentially used for determination, it is preferred that the step S220 may further include comparing the compressor speed or the compressor capacity with a corresponding preset indication parameter interval when an inlet and outlet water temperature difference of a heat exchanger is less than a preset inlet and outlet water temperature difference; and comparing the expansion valve opening and superheat degrees with corresponding preset indication parameter intervals when the inlet and outlet water temperature difference of the heat exchanger is not less than the preset inlet and outlet water temperature difference; or comparing the compressor discharge pressure with a corresponding preset indication parameter interval when the inlet and outlet water temperature difference of the heat exchanger is not less than the preset inlet and outlet water temperature difference; or comparing the supercooling degree with a corresponding preset indication parameter interval when the inlet and outlet water temperature difference of the heat exchanger is not less than the preset inlet and outlet water temperature difference. Preferably, the supercooling degree is obtained when the inlet and outlet water temperature difference of the heat exchanger is not less than the preset inlet and outlet water temperature difference; when the supercooling degree is less than a preset supercooling degree, the supercooling degree and the expansion valve opening degree are compared with respective corresponding preset indication parameter intervals; or when the supercooling degree is not less than the preset supercooling degree, the supercooling degree is compared with a corresponding preset indication parameter interval. Preferably, the expansion valve opening degree is obtained when the supercooling degree is less than the preset supercooling degree; when the expansion valve opening degree reaches a preset threshold with a reference value of 100%, the superheat degree is compared with a corresponding preset indication parameter interval; and when the expansion valve opening degree is less than the preset threshold with a reference value of 100%, the compressor discharge pressure is compared with a corresponding preset indication parameter interval.

The foregoing embodiments focus on how to perform refrigerant leak detection when the air-cooling heat pump system is operating in the cooling mode. In fact, to ensure detection accuracy, it is often desirable to perform the detecting method after the system has been running for a period of time. For example, after the air-cooling heat pump system operates for more than a first preset time, for example, half an hour, then S210 is executed.

In addition, when the air-cooling heat pump system is not operating, there is also a mated refrigerant leak detecting method. For example, the method further includes S260, after the downtime of the air-cooling heat pump system is more than a second preset time, obtaining the refrigerant level in the liquid reservoir and/or the compressor discharge pressure, and comparing the refrigerant level and/or the compressor discharge pressure with respective corresponding preset indication parameter intervals; and when the refrigerant level and/or the compressor discharge pressure fall(s) within the respective corresponding preset indication parameter intervals, determining that a refrigerant leak occurs in the air-cooling heat pump system.

Figure 4:
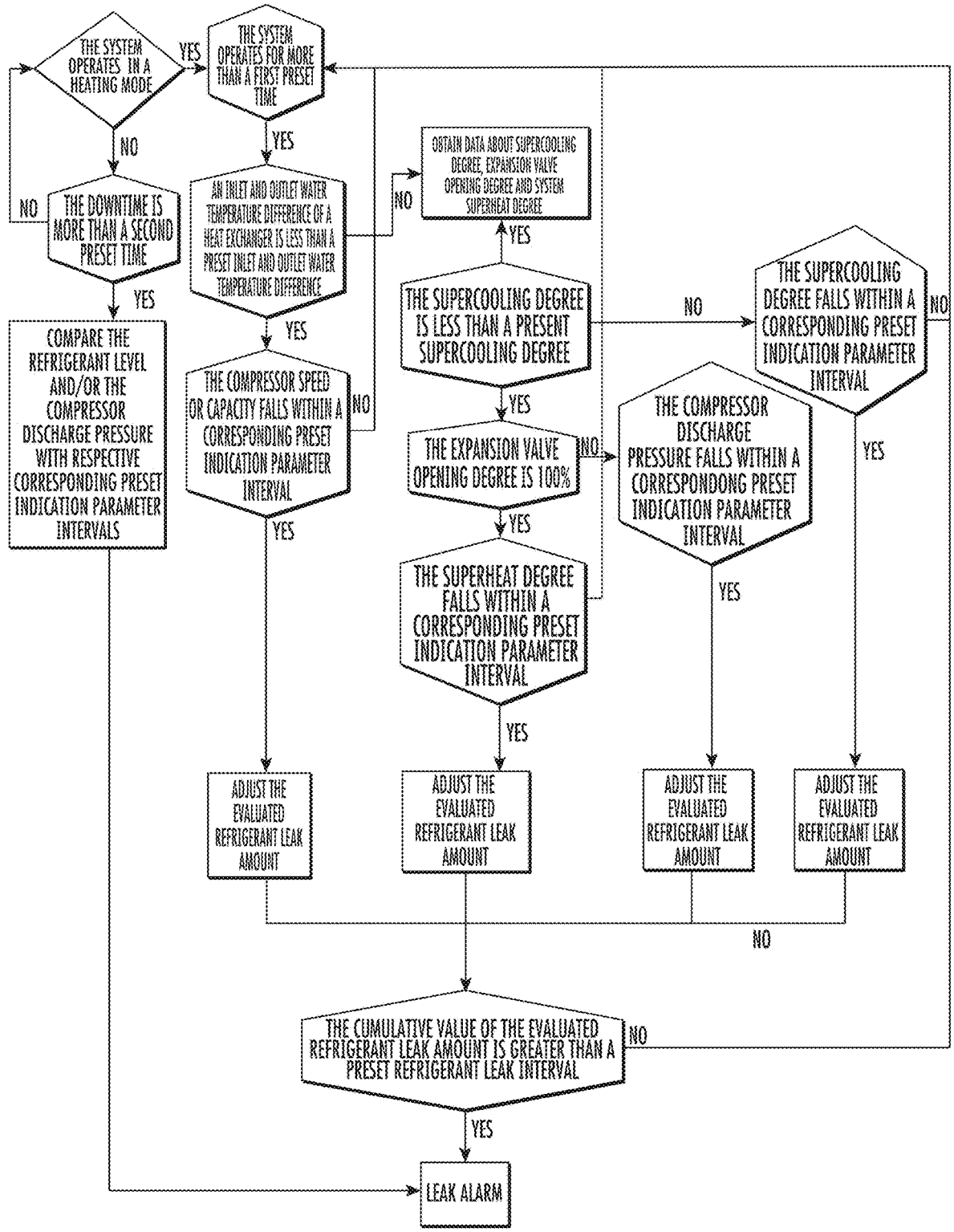
FIG. 4 is a control flow chart of another refrigerant leak detecting method for an air-cooling heat pump system.

Referring to FIG. 4, a set of control flow of the refrigerant leak detecting method for an air-cooling heat pump system will be described below in conjunction with the embodiments described in the foregoing embodiments.

First, it is first determined whether the air-cooling heat pump system is operating in a cooling mode.

When the system is operating in the cooling mode and continues to operate for more than the first predetermined time, a refrigerant leak detecting step is started. In this case, if the inlet and outlet water temperature difference of the system is less than a preset inlet and outlet water temperature difference (for example, 1° C.), the system then enters the first branch process to determine whether the compressor speed or the compressor capacity falls within a corresponding preset indication parameter interval, and if the result of the determination is YES, a corresponding evaluated refrigerant leak amount is obtained and recorded (for example, 5 points); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

In addition, if the inlet and outlet water temperature difference of the system is not less than the preset inlet and outlet water temperature difference (for example, 1° C.), the system then enters the second branch process to obtain data about system supercooling degree, expansion valve opening degree and system superheat degree. When the system supercooling degree is greater than a preset supercooling degree and the expansion valve opening degree reaches a preset threshold with a reference value of 100%, it is determined whether the superheat degree falls within a corresponding preset indication parameter interval, and if the result of the determination is YES, a corresponding evaluated refrigerant leak amount is obtained and recorded (for example, 3 points); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

Furthermore, if the system supercooling degree is less than the preset supercooling degree and the expansion valve opening degree of the system is less than the preset threshold with a reference value of 100%, the system then enters the third branch process to determine whether the compressor discharge pressure falls within a corresponding preset indication parameter interval, and if the result of the determination is YES, a corresponding evaluated refrigerant leak amount is obtained and recorded (for example, 2 points); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

Moreover, if the system supercooling degree is not less than the preset supercooling degree, the system then enters the forth branch process to determine whether the system supercooling degree falls within a corresponding preset indication parameter interval, and if the result of the determination is YES, a corresponding evaluated refrigerant leak amount is obtained and recorded (for example, 1 point); and in this case, it is further determined whether the cumulative value of the evaluated refrigerant leak amount falls within a preset refrigerant leak interval (for example, the interval is greater than or equal to 15 points). If the result of the determination is YES, it is considered that a refrigerant leak occurs in the air-cooling heat pump system; or if the result of the determination is NO, the system repeats all the foregoing method steps.

In yet another aspect, when the air-cooling heat pump system is not operating in the cooling mode and remains a down state for more than the second preset time, a refrigerant leak detecting step in the down state is started. In this case, the refrigerant level in the liquid reservoir and/or the compressor discharge pressure are/is obtained and then compared the refrigerant level and/or the compressor discharge pressure with respective corresponding preset indication parameter intervals; and when the refrigerant level and/or the compressor discharge pressure fall(s) within the respective corresponding preset indication parameter intervals, it is determined that a refrigerant leak occurs in the air-cooling heat pump system.

Further, although not shown in the drawings, there is also provided a refrigerant leak detecting system for an air-cooling heat pump system, wherein the detecting system is used for the refrigerant leak detecting method of any of the foregoing embodiments or a combination thereof, so that it can accurately and reliably detect the refrigerant leak of the heat pump system to be tested.

Similarly, although not shown in the drawings, further provided herein is an air-cooling heat pump system, including the refrigerant leak detecting system for an air-cooling heat pump system of any of the foregoing embodiments or a combination thereof, so that the air-cooling heat pump system can accurately and reliably know its own refrigerant leak condition.

The above examples mainly illustrate the air-cooling heat pump system of the present application, and the refrigerant leak detecting method and system therefor. While only a few of the embodiments of the present application have been described, it will be understood by those skilled in the art that the present invention may be implemented in many other forms without departing from the scope of the present invention, as defined by the claims. The present examples and implementation manners are to be considered as illustrative and nonrestrictive, and the present invention may cover various modifications and replacements without departing from the scope of the present invention as defined by the appended claims.

What is claimed is:

1. A refrigerant leak detecting method for an air-cooling heat pump system, wherein the method comprises:
    (i), obtaining a leak indication parameter set, wherein the leak indication parameter set at least includes, in a heating mode of the air-cooling heat pump system, a refrigerant level in a liquid reservoir and in a cooling mode of the air-cooling heat pump system, a subcooling degree;
    (ii), comparing each leak indication parameter in the leak indication parameter set with a corresponding preset indication parameter interval;
    (iii), when each leak indication parameter falls within the corresponding preset indication parameter interval, obtaining and recording a corresponding evaluated refrigerant leak amount;
    (iv), when a cumulative value of the evaluated refrigerant leak amount falls within a preset refrigerant leak interval, determining that a refrigerant leak occurs in the air-cooling heat pump system; when the cumulative value of the evaluated refrigerant leak amount does not fall within the preset refrigerant leak interval, returning to the step (i);
    wherein the leak indication parameter set further includes one or more of the following: compressor speed or compressor capacity, and expansion valve opening and superheat degrees, and compressor discharge pressure;
    wherein leak indication parameters in the leak indication parameter set are each used to indicate different refrigerant leak degrees; in the step (ii), the leak indication parameters in the leak indication parameter set are each compared with the corresponding preset indication parameter intervals according to a trend indicating refrigerant leak degrees from high to low;
    wherein the compressor speed or the compressor capacity; the expansion valve opening and superheat degrees; and the refrigerant level are used to indicate refrigerant leak degrees from high to low, respectively;
    or alternatively the compressor speed or compressor capacity; the expansion valve opening and superheat degrees; the compressor discharge pressure; and the subcooling degree are used to indicate the refrigerant leak degrees from high to low, respectively.

2. The detecting method according to claim 1, further comprising:
    (v), performing an alarm operation when determining that a refrigerant leak occurs in the air-cooling heat pump system.

3. The detecting method according to claim 1, wherein in the step (iii), when each leak indication parameter in the leak indication parameter set falls within the preset indication parameter interval:
    the compressor speed or compressor capacity; the expansion valve opening and superheat degrees; and the refrigerant level in the leak indication parameter set correspond to evaluated refrigerant leak amounts from high to low, respectively;
    or alternatively the compressor speed or compressor capacity; the expansion valve opening and superheat degrees; the compressor discharge pressure; and the subcooling degree in the leak indication parameter set correspond to evaluated refrigerant leak amounts from high to low, respectively.

4. The detecting method according to claim 1, wherein (ii) further comprises:
    comparing the compressor speed or the compressor capacity with the corresponding preset indication parameter interval when an inlet and outlet water temperature difference of a heat exchanger is less than a preset inlet and outlet water temperature difference; and
    one or more of:
    comparing the expansion valve opening and superheat degrees with the corresponding preset indication parameter intervals when the inlet and outlet water temperature difference of the heat exchanger is not less than the preset inlet and outlet water temperature difference; or
    comparing the refrigerant level with the corresponding preset indication parameter interval when the inlet and outlet water temperature difference of the heat exchanger is not less than the preset inlet and outlet water temperature difference; or
    comparing the compressor discharge pressure with the corresponding preset indication parameter interval when the inlet and outlet water temperature difference of the heat exchanger is not less than the preset inlet and outlet water temperature difference; or
    comparing the subcooling degree with the corresponding preset indication parameter interval when the inlet and outlet water temperature difference of the heat exchanger is not less than the preset inlet and outlet water temperature difference.

5. The detecting method according to claim 4, wherein (ii) further comprises:
    obtaining the expansion valve opening degree when the inlet and outlet water temperature difference of the heat exchanger is not less than the preset inlet and outlet water temperature difference; when the expansion valve opening degree reaches a preset opening degree threshold, comparing the superheat degree with the corresponding preset indication parameter interval; and when the expansion valve opening degree is less than the preset opening degree threshold, comparing the refrigerant level with the corresponding preset indication parameter interval.

6. The detecting method according to claim 4, wherein the step (ii) further comprises:
obtaining a subcooling degree when the inlet and outlet water temperature difference of the heat exchanger is not less than the preset inlet and outlet water temperature difference; when the subcooling degree is not greater than a preset subcooling degree, comparing the subcooling degree with the corresponding preset indication parameter interval; or when the subcooling degree is greater than the preset subcooling degree, comparing the superheat degree and the expansion valve opening degree with the respective corresponding preset indication parameter intervals.

7. The detecting method according to claim 6, wherein (ii) further comprises:
obtaining the expansion valve opening degree when the subcooling degree is greater than the preset subcooling degree; when the expansion valve opening degree reaches a preset opening degree threshold, comparing the superheat degree with the corresponding preset indication parameter interval; and when the expansion valve opening degree is less than the preset opening degree threshold, comparing the compressor discharge pressure with the corresponding preset indication parameter interval.

8. The detecting method according to claim 1, wherein after the air-cooling heat pump system operates for more than a first preset time, the step (i) is executed.

9. The detecting method according to claim 1, wherein the method further comprises, after a downtime of the air-cooling heat pump system is more than a preset time, obtaining the refrigerant level in the liquid reservoir and/or a compressor discharge pressure, and comparing the refrigerant level and/or the compressor discharge pressure with respective corresponding preset indication parameter intervals; and when the refrigerant level and/or the compressor discharge pressure fall(s) within the respective corresponding preset indication parameter intervals, determining that a refrigerant leak occurs in the air-cooling heat pump system.

10. A refrigerant leak detecting system for an air-cooling heat pump system, wherein the detecting system is used for the refrigerant leak detecting method for an air-cooling heat pump system of claim 1.

11. An air-cooling heat pump system, comprising the refrigerant leak detecting system for an air-cooling heat pump system of claim 10.

\* \* \* \* \*